(12) United States Patent
Dobson et al.

(10) Patent No.: US 9,147,084 B2
(45) Date of Patent: Sep. 29, 2015

(54) METHOD AND SYSTEM FOR ISOLATING SECURE COMMUNICATION EVENTS FROM A NON-SECURE APPLICATION

(71) Applicant: OpenPeak Inc., Boca Raton, FL (US)

(72) Inventors: Andrew James Dobson, Wellington, FL (US); David Medina, Miami, FL (US)

(73) Assignee: OPENPEAK INC., Boca Raton, FL (US)

( * ) Notice: Subject to any disclaimer, the term of this patent is extended or adjusted under 35 U.S.C. 154(b) by 0 days.

(21) Appl. No.: 14/291,905

(22) Filed: May 30, 2014

(65) Prior Publication Data

US 2014/0359793 A1    Dec. 4, 2014

Related U.S. Application Data

(60) Provisional application No. 61/829,513, filed on May 31, 2013.

(51) Int. Cl.

| | |
|---|---|
| *G06F 7/04* | (2006.01) |
| *G06F 17/30* | (2006.01) |
| *H04N 7/16* | (2011.01) |
| *G06F 21/62* | (2013.01) |
| *G06F 21/55* | (2013.01) |
| *G06F 21/60* | (2013.01) |
| *H04L 29/06* | (2006.01) |
| *H04W 4/12* | (2009.01) |
| *H04W 12/08* | (2009.01) |

(52) U.S. Cl.
CPC .......... *G06F 21/6245* (2013.01); *G06F 21/554* (2013.01); *G06F 21/606* (2013.01); *G06F 21/629* (2013.01); *G06F 21/6263* (2013.01); *H04L 63/105* (2013.01); *H04W 4/12* (2013.01); *G06F 2221/2149* (2013.01); *H04W 12/08* (2013.01)

(58) Field of Classification Search
CPC .................................................... G06F 21/6245
USPC ............................................................ 726/30
See application file for complete search history.

(56) References Cited

U.S. PATENT DOCUMENTS

| | | | |
|---|---|---|---|
| 8,261,064 B2 * | 9/2012 | Ditzman et al. .............. | 713/164 |
| 2004/0127190 A1 | 7/2004 | Hansson et al. | |
| 2007/0118874 A1 * | 5/2007 | Adams et al. ..................... | 726/1 |

(Continued)

FOREIGN PATENT DOCUMENTS

| | | |
|---|---|---|
| KR | 100678927 B1 | 2/2007 |
| KR | 1020130049343 A | 5/2013 |

OTHER PUBLICATIONS

U.S. Appl. No. 61/973,898, filed Apr. 2, 2014, 27 pages.

(Continued)

*Primary Examiner* — Dant Shaifer Harriman

(57) ABSTRACT

A system and method for isolating secure communication events from a non-secure application are described herein. The method can include the steps of intercepting a communication event from an external communications network or an external communications device and determining whether the communication event is a secure communication event. If the communication event is a secure communication event, the secure communication event can be processed by a secure application. In addition, the secure communication event can be prevented from being processed by the non-secure application.

18 Claims, 2 Drawing Sheets

(56) References Cited

U.S. PATENT DOCUMENTS

2011/0135091 A1  6/2011  Radatti
2012/0005764 A1* 1/2012  MacKay et al. ............... 726/30
2013/0091543 A1  4/2013  Wade et al.
2014/0148120 A1* 5/2014  Buck ......................... 455/404.2

OTHER PUBLICATIONS

U.S. Appl. No. 61/008,294, filed Jun. 5, 2014, 31 pages.
International Search Report and Written Opinion for International Application No. PCT/US2014/040305, mailed Apr. 15, 2014, 16 pages.

* cited by examiner

METHOD AND SYSTEM FOR ISOLATING SECURE COMMUNICATION EVENTS FROM A NON-SECURE APPLICATION

CROSS-REFERENCE TO RELATED APPLICATIONS

This patent application claims priority to U.S. Provisional Patent Application No. 61/829,513, filed on May 31, 2013, which is incorporated herein by reference in its entirety.

FIELD OF TECHNOLOGY

The present description relates to systems and methods for protecting secure communications and more particularly, for isolating secure communications from non-secure applications.

BACKGROUND

A recent development in wireless technology is the deployment of mobile devices that are provisioned to support the installation of secure applications. Such secure applications may permit a user to access sensitive enterprise data and to enable the selective enforcement of corporate policies against the secure applications themselves or the mobile device. Many of these provisioned mobile devices, however, continue to maintain support for the installation and operation of non-secure applications. For example, the Android operating system allows for the implementation of two virtual workspaces, one being a secure workspace and the other being a personal workspace. The secure workspace may provide access to the secure applications and secure content that are downloaded to the mobile device and are associated with a particular enterprise. In addition, the personal workspace may provide access to the user's personal (i.e., non-secure) applications and content that are on the mobile device and are associated with the user's personal life.

In view of this arrangement, it is paramount that interaction between the two types of content (i.e., secure and non-secure) be kept to a minimum. In particular, the enterprise does not want its data or networks at risk of unauthorized exposure, while the user may wish to prevent the enterprise from having access to the user's personal content. Moreover, if the mobile device were to be lost or stolen, there is a possibility that information directed to the secure workspace but inadvertently shared with the personal workspace could be collected by an unauthorized party. Thus, it is important to take preemptive steps to ensure that information associated with an enterprise and meant for distribution to a secure workspace is kept away from a non-secure environment on a computing device that supports this type of an arrangement.

SUMMARY

A method for isolating secure communication events from a non-secure application is described herein. The method can include the steps of intercepting a communication event from an external communications network or an external communications device and determining whether the communication event is a secure communication event. If the communication event is a secure communication event, the secure communication event may be processed by a secure application and the secure communication event may be prevented from being processed by the non-secure application.

As an example, determining whether the communication event is a secure communication event may include the steps of comparing contact identification information associated with the communication event with a database of secure contacts and identifying the communication event as a secure communication event if the contact identification information matches secure contact identification information associated with at least one of the secure contacts. As another example, the contact identification information and the secure contact identification information may be telephone numbers. In addition, the communication event may be, for example, an incoming telephone call or an incoming message. The method can also include the step of registering with an operating system for the communication events from the external communications network or the external communications device.

At least one of the secure contacts may be a personal contact associated with the non-secure application. In this example, the method may further include the steps of prioritizing the secure contact over the personal contact and identifying the communication event as a secure communication event to prevent the secure communication event from being processed by the non-secure application.

The communication event may be a non-secure communication event. In this example, the method may further include the step of permitting the non-secure communication event to be processed by the non-secure application.

In another embodiment, the secure application may be part of a secure personal information manager. The secure application can also be part of a secure workspace, and the non-secure application may be part of a non-secure workspace. In this scenario, the method may further include the step of generating a muted notification for the non-secure workspace.

Another method for isolating secure communication events from a non-secure application is described herein. The method can include the steps of installing a secure application on a computing device and registering with an operating system of the computing device for a number of predefined events. The predefined events may be associated with an external communication network or an external communication device. The method can also include the step of securely processing the predefined events by the secure application such that the predefined events are prevented from being processed by a non-secure application of the computing device.

As an example, the secure application may be part of a secure workspace of the computing device. As another example, the predefined events may be communication events that are associated with one or more secure contacts of the computing device.

A computing device that includes a secure application and a non-secure application is also described herein. The computing device can include a transceiver that can be configured to receive communication events from an external communications network or an external communications device and memory that can be configured to at least store the secure applications. The computing device can be configured to determine whether the communication events received by the transceiver are secure communications events and to process the secure communication events with the secure application. This arrangement can prevent the secure communication event from being processed by the non-secure application.

The computing device can also include a display that can be configured to display the secure application or the non-secure application. Further, the computing device can be configured to prevent certain data associated with a secure communication event from being displayed on the display in association with the operation of a non-secure application.

As an example, one of the secure applications can be a secure contacts application that lists one or more secure contacts that may be attached to secure contact identification information. The computing device can be further configured to compare contact identification associated with the communication events with the secure contact identification information attached to the secure contacts. This comparison may serve as the basis for the determination of whether a communication event is a secure communication event.

A secure contact is also capable of being a personal contact on the computing device, and the personal contact can be listed in a non-secure contacts application. In one arrangement, the secure contacts application can be part of a secure personal information manager that also includes a secure email application, a secure messaging application and a secure calendar application, although it is not necessarily limited to these particular secure applications. The computing device can also support both a non-secure workspace and a secure workspace, and the display can be further configured to display muted notifications when a user is active on the non-secure workspace. As an example, the communication events may be telephone calls or messages.

Further features and advantages, as well as the structure and operation of various embodiments, are described in detail below with reference to the accompanying drawings. It is noted that this description is not limited to the specific embodiments presented herein. Such embodiments are provided for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the subject matter described herein and, together with the description, further serve to explain the principles of such subject matter and to enable a person skilled in the relevant art(s) to make and use the subject matter.

Figure 1:
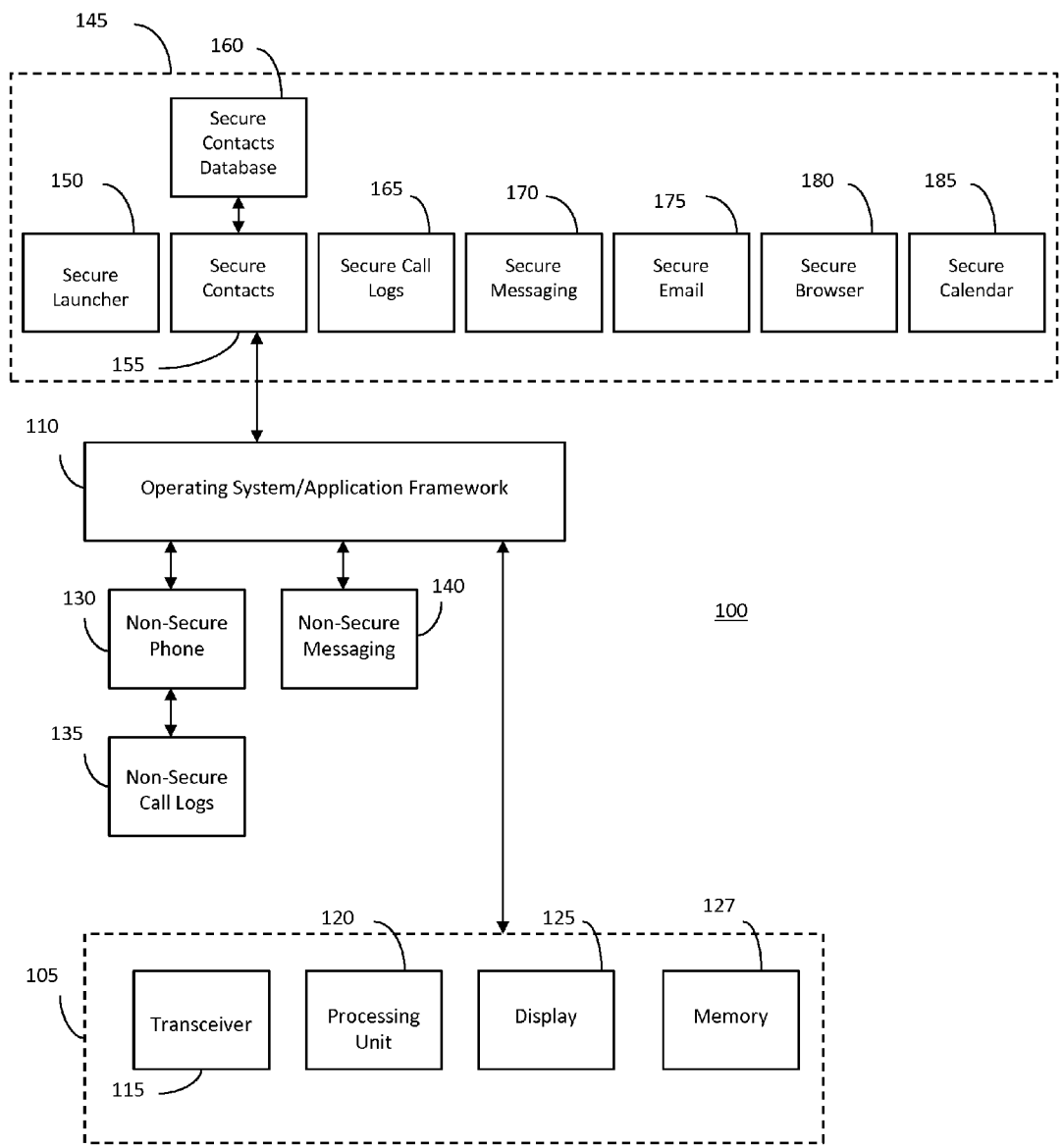
FIG. 1 illustrates an example of a system for isolating secure communication events from a non-secure application.

Applicants expressly disclaim any rights to any third-party trademarks or copyrighted images included in the figures. Such marks and images have been included for illustrative purposes only and constitute the sole property of their respective owners.

The features and advantages of the embodiments herein will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

The following detailed description refers to the accompanying drawings that illustrate exemplary embodiments; however, the scope of the present claims is not limited to these embodiments. Thus, embodiments beyond those shown in the accompanying drawings, such as modified versions of the illustrated embodiments, may nevertheless be encompassed by the present claims.

References in the specification to "one embodiment," "an embodiment," "an example embodiment," "one arrangement," "an arrangement" or the like, indicate that the embodiment or arrangement described may include a particular feature, structure, or characteristic, but every embodiment may not necessarily include the particular feature, structure, or characteristic. Moreover, such phrases are not necessarily referring to the same embodiment or arrangement. Furthermore, when a particular feature, structure, or characteristic is described in connection with an embodiment or arrangement, it is submitted that it is within the knowledge of one skilled in the art to implement such feature, structure, or characteristic in connection with other embodiments or arrangements whether or not explicitly described.

Several definitions that apply throughout this document will now be presented. The term "exemplary" as used herein is defined as an example or an instance of an object, apparatus, system, entity, composition, method, step or process. The term "communicatively coupled" is defined as a state in which two or more components are connected such that communication signals are able to be exchanged between the components on a unidirectional or bidirectional (or multi-directional) manner, either wirelessly, through a wired connection or a combination of both. A "computing device" is defined as a component that is configured to perform some process or function for a user and includes both mobile and non-mobile devices. The terms "computer program medium" and "computer readable medium" are defined as one or more components that are configured to store instructions that are to be executed by a processing unit or some other component.

An "application" is defined as a program or programs that perform one or more particular tasks on a computing device. Examples of an application include programs that may present a user interface for interaction with a user or that may run in the background of an operating environment and that may not present a user interface while in the background. The term "secure application" is defined as an application that has been modified from its conventional form to restrict communication between the application and unauthorized programs or devices, restrict operation of the application based on policy or to alter, augment or add features associated with the operation of the application. A "non-secure application," conversely, is defined as an application that has not been converted to a secure application. The term "operating system" is defined as a collection of software components that directs a computing device's operations, including controlling and scheduling the execution of other programs and managing storage, input/output and communication resources. A "processing unit" is defined as one or more components that execute sets of instructions, and the components may be disparate parts or part of a whole unit and may not necessarily be located in the same physical location. The term "memory" or "memory element" is defined as one or more components that are configured to store data, either on a temporary or persistent basis. An "interface" is defined as a component or a group of components that enable(s) a device to communicate with one or more different devices, whether through hard-wired connections, wireless connections or a combination of both. A "transceiver" is defined as a component or a group of components that transmit signals, receive signals or transmit and receive signals, whether wirelessly or through a hard-wired connection or both.

The term "secure workspace" is defined as an environment of one or more secure applications that restrict access to the secure applications or restricts communications exchanges between the secure applications and the non-secure applications. A "non-secure workspace" is defined as a conventional environment of a computing device, which typically houses personal content of a user of the computing device. A "secure contact" is a contact that is associated with an enterprise, organization or individual that has taken steps to protect its content that is part of a computing device on which the contact is stored. A "non-secure contact" is a personal contact that is associated with the user of a computing device.

The term "external communications network" is defined as one or more networks that are capable of exchanging communication signals with a computing device but are not part of the computing device. The term "external communications device" is defined as one or more communication devices that are capable of conducting communications with a computing device, with or without the assistance of a communications network, but are physically separate from the computing device. A "communication event" is defined as any type of communication message or signal that may be processed (e.g., received or transmitted) by a computing device. In addition, a "secure communication event" is defined as a communication event that is in some way associated with a secure contact of a computing device that processes the communication event.

As explained earlier, many mobile devices have the ability to support both secure and non-secure workspaces, which means a user of such a mobile device may have access to sensitive enterprise data. While this arrangement increases the access to the enterprise data that a user may have, it also potentially exposes the protected information to unauthorized sources. Thus, steps must be taken to minimize such exposure.

A method and system for isolating secure communication events from a non-secure application, which may be helpful, are presented here. The method can include the steps of intercepting a communication event from an external communications network or an external communications device and determining whether the communication event is a secure communication event. If the communication event is a secure communication event, the secure communication event can be processed by a secure application. In addition, the secure communication event can be prevented from being processed by the non-secure application.

As such, the method and system can permit secure processing of the communication events, but information related to the events that would normally be displayed or accessible in relation to the operation of non-secure applications can remain protected. Moreover, minimal effort is required to implement such a solution into the computing device.

Referring to FIG. 1, an example of a system 100 for isolating secure communication events from a non-secure application is shown. The system 100 shown here may be part of a mobile communication device, although it is understood that the principles described here may be implemented in virtually any type of computing device that supports communications with other components or networks. The system 100 can include a hardware layer 105 that coordinates with an operating system or application framework 110 to facilitate various processes performed by the system 100. As an example, the hardware layer can include a transceiver 115, a processing unit 120, a display 125 and memory 127. The transceiver 115 can serve as an interface to enable the system 100 to conduct communications (wired or wireless) with an external communications network or an external communications device. The display 125 can display various types of data to a user, including (without limitation) information related to communication events that are received from or transmitted to the external communications network or device. The processing unit 120, as is known in the art, can execute instructions to support the operations of the system 100. The memory 127 can be any suitable form, amount and combination of storage units and can be configured to store one or more secure applications and non-secure applications. Although not shown in the drawing, the system 100 may include any suitable number and type of virtual machines, libraries and drivers to implement the features described herein.

In one arrangement, the system 100 can include a non-secure phone application 130, a non-secure call logs application 135 and a non-secure messaging application 140 (other non-secure applications may also be part of the system 100). The non-secure phone application 130, under the supervision of the operating system 110, can facilitate the execution of incoming and outgoing communication exchanges for the system 100. The non-secure call logs application 135, which may or may not be part of the non-secure phone application 130, may record information relating to these communication exchanges. For example, the non-secure call logs application 135 can record the identity of the calling or called party, the number of that party, the time the call was executed and the duration of the call. This information may be displayed to a user of the system 100 through the display 125, and additional features may be offered to a user, such as the option to call the identified party or to add the identified telephone number as a contact. The non-secure messaging application 140 can support messaging, such as short message service (SMS) or multi-media messaging service (MMS), the contents of which may also be freely displayed to a user of the system 100.

One or more secure applications may also be installed on the device hosting the system 100. For example, a secure personal information manager (PIM) 145 may be part of the system 100, and the secure PIM 145 can include certain types of secure applications to protect sensitive data, examples of which will be presented below. As part of the installation of secure applications, the device housing the system 100 may be configured to support separate workspaces for personal content and secure content. These workspaces may be virtual containers, and a user may be required to provide a password or some other identifying information to access the secure workspace or the secure applications. The secure applications that are part of the secure workspace may be conventional applications that have been modified to support the policies and protect the data of an enterprise or organization that has some association with the user of the system 100. For example, a secure application may be configured to encrypt data that it writes to storage or to block certain features based on a current location in which the system 100 is operating. As another example, through namespace enforcement and other techniques, non-secure applications may be restricted from exchanging data with or otherwise accessing the secure applications installed on the device. Additional information on this arrangement, including how secure applications may be created, can be found in U.S. Pat. No. 8,695,060, issued on Apr. 8, 2014, which is incorporated by reference herein in its entirety.

As noted earlier, the secure PIM 145 may include several secure applications. Examples of such secure applications include a secure launcher 150, a secure contacts application 155, a secure contacts database 160, a secure call logs application 165, a secure messaging application 170, a secure email application 175, a secure browser 180 and a secure calendar 185. Of course, the secure PIM 145 is not limited to these particular secure applications, as the secure PIM 145 may include a greater or a fewer number of secure applications in comparison to those presented here.

The secure launcher 150 may be responsible for the general management of the secure PIM 145, including the process of obtaining and verifying the authorization information provided by the user to access the secure applications and overseeing such access. Moreover, the secure contacts application 155 may manage the secure contacts of the system 100, and these secure contacts may be related to the organization that is responsible for or associated with the installation and/or operation of the secure PIM 145. The secure contacts database 160, which may be part of the secure contacts application 155 or may be part of some other application or component, may include secure contact identification information related to the secure contacts. As an example, the secure contact identification may include the name of the secure contact and information about the secure contact's association with the relevant enterprise or organization, such as business telephone number(s), job title, business address or department, business email, etc., all or at least some of which may be considered to be confidential. In addition, the secure call logs application 165 may be responsible for selectively recording, for example, incoming or outgoing communication events, such as telephone calls that involve secure contacts.

The secure messaging application 170 may enable secure message exchange for a user of the system 100, including SMS and MMS messaging, such as when the user is receiving messages from or sending messages to a secure contact. The secure email application 175 may be associated with an exchange that is supported by the enterprise or organization responsible for the secure PIM 145. In addition, the secure browser 180 may be attached to one or more policies—like the whitelisting or blacklisting of certain sites, restricting hours of operation or limiting access to a particular SSID, etc.—set by the enterprise or organization. The secure calendar 185 can manage a user's secure appointments or other scheduled events in relation to the enterprise or organization. As will be explained below, any number of these secure applications of the secure PIM 145 may register with the operating system 110 to ensure that certain events are to be processed by the requesting secure application.

Figure 2:
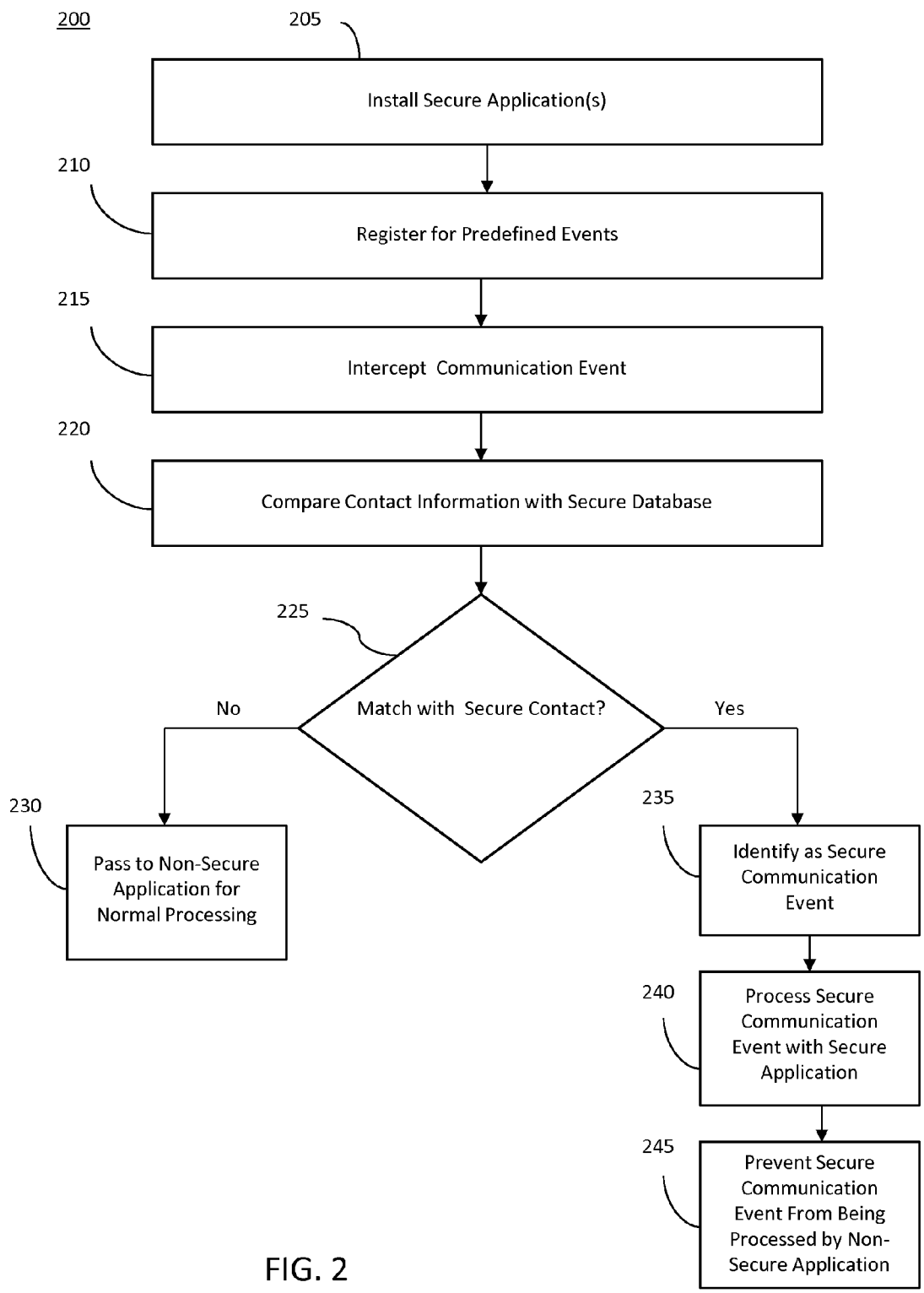
FIG. 2 illustrates an example of a method for isolating secure communication events from a non-secure application.

Referring to FIG. 2, an example of a method 200 for isolating secure communication events from a non-secure application is shown. It is important to note that the method 200 may include additional or even fewer steps or processes in comparison to what is illustrated in FIG. 2. Moreover, the method 200 is not necessarily limited to the chronological order that is shown in FIG. 2. In describing the method 200, reference may be made to FIG. 1, although it is understood that the method 200 may be practiced with any other suitable systems and components.

At step 205, one or more secure applications may be installed on a computing device, and at step 210, a number of predefined events can be registered with an operating system of the computing device.

For example, referring to FIG. 1, the secure PIM 145 and its associated secure applications may be installed on the computing device that houses the system 100. As part of this installation, any number of the secure applications may register with the operating system such that certain events may be sent to the registering secure applications. As a specific example, the secure contacts application 155 may register for all or at least some incoming and/or outgoing communication events, which may be coming from or going to an external communications network or an external communications device. As another example, these communication events may be incoming or outgoing telephone calls or messages, like SMS or MMS messages, although any type of communication event that includes information that can be used to identify the originator or intended recipient of the event may be identified by the secure application during the registration process.

As part of this registration, the secure applications of the secure PIM 145 may have priority over the non-secure applications that typically process the communication events. In other words, the operating system may forward the communication event to the secure applications that may have registered for the event for processing prior to (or in lieu of) sending the event to one or more (or any) of the relevant non-secure applications.

Referring back to FIG. 2, at step 215, a communication event from the external communication network or device can be intercepted, and it can be determined whether the intercepted communication event is a secure communication event. For example, at step 220, contact information associated with the communication event can be compared to a database of secure contacts. At decision block 225, it can be determined whether the contact identification information associated with the communication event matches secure contact identification information associated with at least one of the secure contacts.

If there is no match, then the communication event may be passed to a non-secure application for normal or conventional processing, as shown at step 230. If, however, there is a match, then the communication event can be identified as a secure communication event, as shown at step 235, and the secure communication event can be processed by a secure application, as shown at step 240. In addition, the secure communication event can be prevented from being processed by a non-secure application, as shown at step 245.

Referring once again to FIG. 1, an example of this process will be presented. Consider the scenario in which the system 100 receives an incoming telephone call. In this example, the transceiver 115 hands over the incoming call to the operating system 110. Based on the previous registration process, the operating system 110 may forward the incoming call to the secure contacts application 155 for initial processing. The secure contacts application 155 may obtain contact identification information from the incoming call, such as a telephone number, and compare that information with information in the secure contacts database 160. If the telephone number of the incoming call matches a number contained in the secure contacts database 160 that is associated with a secure contact, then the secure contacts application 155 (or some other component) can identify this communication event as a secure communication event. If there is no match, then the communication event can be identified as a non-secure communication event. Any suitable threshold can be used to identify a match, including exact matches or substantial matches, such as in the case where the incoming call does not include the area code of the telephone number associated with a secure contact.

In either case, the non-secure phone application may process the incoming call in conventional fashion. Thus, there should not be any interruption in permitting a user to answer and conduct the incoming call, irrespective of whether the call is a secure or a non-secure communication event. As part of the normal procedure in processing an incoming call, a record of the call may be recorded by the non-secure call logs application 135. If the incoming call has been identified as a non-secure communication event, the recordation of this call may remain in place, and the user may have access to this information, such as through the display 125.

In contrast, if the incoming call has been identified as a secure communication event, the secure event may be processed by a secure application, and the event may be prevented from being processed by a non-secure application. For example, the secure contacts application 155 may signal the secure call logs application 165, which, in response, can record the information related to the secure call, much the same as it would normally be recorded by the non-secure call logs application 135. In addition, the secure contacts application 155 can signal the operating system 110 to block the recordation of any (or at least some) of the information relating to the secure call by the non-secure call logs application 135. Alternatively, if the information has already been recorded by the non-secure call logs application 135, the secure contacts application 155 can signal the operating system 110 to remove any such information, or at least a portion of it. Thus, if a user launches or opens the non-secure call logs application 135, such as when the user is operating in the personal or non-secure workspace, the information related to the secure call may not be seen on the display 125 or otherwise accessed by the user. If, however, the user launches or opens the secure call logs application 165, such as when the user is operating in the secure workspace, the user may have access to the recorded information associated with the secure call and may be able to see this data on the display 125. Accordingly, sensitive information relating to a communication event may be blocked from being accessed by a user who does not have authorization to launch or operate the secure applications.

As noted above, if the communication event is a secure communication event, the secure communication event may be processed by a secure application. This phrase means that any portion of the secure communication event may be processed by any suitable combination of secure applications, a portion that would normally be processed by non-secure applications in the normal course of handling communication events. As also described above, if the communication event is a secure communication event, the secure communication event may be prevented from being processed by a non-secure application. This phrase means that at least some portion of the secure communication event that would normally be processed by one or more non-secure applications is prevented from undergoing such processing or may initially undergo such processing but steps may be taken to remove or block access to the results of such processing.

Although the example presented above described an incoming call as the communication event, it must be stressed that the invention is not so limited. For example, a similar technique may be conducted for outgoing telephone calls. In particular, when the outgoing call is executed, the secure contacts application 155 may determine whether the call is a secure communication event, e.g., the outgoing call is directed to a secure contact. If it is, the record of the outgoing call may be blocked or removed from the non-secure call logs application 135. Further, there are additional aspects of a secure communication event that may be handled by a secure application. For example, the system may include a non-secure voicemail application, and the secure PIM 145 may include a secure voicemail application. If a secure call comes in but there is no answer, then the system 100 may take steps to ensure that the secure voicemail application processes the voicemail, if one is left. Moreover, the non-secure voicemail application can be prevented from processing the voicemail, similar to the procedure described in relation to the non-secure call logs application 135. In this manner, a user who is authorized to access the secure voicemail application may be able to determine that a voicemail associated with a secure call is available and can access the voicemail, while a user with only access to the non-secure voicemail application may not be able to see any evidence of such a voicemail (or limited evidence thereof).

Another example of a communication event that may be processed in a similar fashion is a message, such as an incoming or outgoing SMS or MMS message. For example, an incoming MMS message may be associated with a secure contact, and the secure contacts application 155 may have previously registered with the operating system 110 for this type of event and may identify the message as a secure communication event. In this case, the secure MMS message can be processed by the secure messaging application 170, and the non-secure messaging application 140 may be prevented from doing so. If the incoming MMS message is not a secure communication event, the non-secure MMS message can be processed by the non-secure messaging application 140 in a conventional manner.

In view of the above description, virtually any type of communication event—whether incoming or outgoing—may be identified as a secure communication event and isolated from one or more non-secure applications in some manner. All that is required is that the communication event should be registered for, and it should contain some information that enables the system 100 to tie it to a secure contact.

Generally speaking, the secure contacts of the secure workspace of the device housing the system 100 are distinct from the personal contacts that may be part of the user's personal or non-secure workspace. Nevertheless, there may be instances where the secure contacts and personal contacts overlap, such as when a user has a co-worker designated as both a secure contact and a personal contact. In this example, the co-worker may be a secure contact listed in the secure contacts application 155 and a personal contact listed in a non-secure contacts application.

To accommodate this situation, the system 100 may be configured such that the secure contact is prioritized over the personal contact. In particular, if a communication event is associated with a secure contact, then the communication event may be classified as a secure communication event, even if the secure contact may also be listed as a personal contact. Of course, if desired, the system 100 can be configured to grant priority to the personal contact over the secure contact in a similar situation, which would enable conventional processing of the communication event associated with the personal contact.

As explained earlier, the device housing the system 100 may install one or more secure applications, and certain policies may be enforced against these secure applications. It is understood that the secure applications of the secure PIM 145 may indeed have policies enforced against them, either collectively or individually. For example, one or more of the secure applications of the secure PIM 145 may be disabled if the system 100 is located outside a particular region or the computing device is not communicatively coupled to an authorized network or component. As another example, one or more of the secure applications may be disabled during a certain time period, such as outside of normal working hours or on weekends. There are numerous other ways in which the secure applications of the system 100 may be configured or managed based on such policies.

As also explained earlier, the device housing the system 100 may include a secure workspace and a personal or non-secure workspace. To access the secure workspace, the user may be required to submit authentication information, while the user may freely access the personal workspace without any such requirement. While operating in the secure workspace, the user may be made aware of certain secure communication events. For example, the contents of a secure message that is directed to the secure messaging application 170 may be temporarily shown on the display 125.

If, however, the user is operating in the non-secure workspace, certain steps may be taken to ensure that the substance of a secure communication event is protected from being potentially displayed to or otherwise accessed by an unauthorized person. For example, any notification that may be presented to a user while operating in the personal workspace may be muted such that the user is simply made aware of the existence of the secure communication event but no other information is revealed. A secure application, such as the secure contacts application 155, may also register with the operating system 110 for these notifications and can generate the muted notifications for the non-secure workspace. A muted notification can be any notification in which certain sensitive data that would normally be displayed is removed from the notification. Examples include the contents of a message or communication event, the telephone number associated with a communication event or any name or other identifying data related to the secure contact associated with the secure communication event. In one specific example, the notification for the non-secure workspace can simply note that a message or some other event has been received at the secure workspace. In fact, any such notifications may be completely blocked such that a user operating in the non-secure workspace may not be informed of the receipt of such communication events.

While various embodiments have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

What is claimed is:

1. A method for isolating secure communication events from a non-secure application, comprising:
   on a computing device that includes at least one secure application and a non-secure application, intercepting a communication event from an external communications network or an external communications device;
   determining whether the communication event is a secure communication event;
   if the communication event is a secure communication event, processing the secure communication event by one of the secure applications; and
   preventing the secure communication event from being processed by the non-secure application;
   wherein one of the secure applications is a secure contacts application that lists one or more secure contacts that are attached to secure contact identification information;
   wherein the secure contacts applications is part of a secure personal information manager that also includes a secure email application, a secure messaging application and a secure calendar application.

2. The method according to claim 1, wherein determining whether the communication event is a secure communication event comprises:
   comparing contact identification information associated with the communication event with the secure contacts of the secure contacts application; and
   identifying the communication event as a secure communication event if the contact identification information matches the secure contact identification information associated with at least one of the secure contacts.

3. The method according to claim 2, wherein the contact identification information and the secure contact identification information are telephone numbers.

4. The method according to claim 2, wherein at least one of the secure contacts is a personal contact associated with the non-secure application and the method further comprises:
   prioritizing the secure contact over the personal contact; and
   identifying the communication event as a secure communication event to prevent the secure communication event from being processed by the non-secure application.

5. The method according to claim 1, wherein the communication event is an incoming telephone call or an incoming message.

6. The method according to claim 1, wherein if the communication event is a non-secure communication event, the method further comprises permitting the non-secure communication event to be processed by the non-secure application.

7. The method according to claim 1, wherein the secure application processing the secure communication event is part of the secure personal information manager.

8. The method according to claim 1, wherein the secure application processing the secure communication event is part of a secure workspace and the non-secure application is part of a non-secure workspace and the method further comprises generating a muted notification for the non-secure workspace.

9. The method according to claim 1, further comprising registering with an operating system for the communication events from the external communications network or the external communications device.

10. A method for isolating secure communication events from a non-secure application, comprising:
    installing at least one secure application on a computing device;
    registering with an operating system of the computing device for a number of predefined events, wherein the predefined events are associated with an external communication network or an external communication device; and
    securely processing the predefined events by one of the secure applications such that the predefined events are prevented from being processed by a non-secure application of the computing device;
    wherein one of the installed secure applications is a secure contacts application that lists one or more secure contacts that are attached to secure contact identification information;

wherein the secure contacts applications is part of a secure personal information manager that also includes a secure email application, a secure messaging application and a secure calendar application.

11. The method according to claim 10, wherein the secure application that securely processes the predefined events is part of a secure workspace of the computing device.

12. The method according to claim 10, wherein the predefined events are communication events that are associated with one or more of the secure contacts of the computing device.

13. A computing device that includes at least one secure application and a non-secure application, comprising:
   a transceiver that is configured to receive communication events from an external communications network or an external communications device; and
   memory that is configured to at least store the secure applications;
   wherein the computing device is configured to determine whether the communication events received by the transceiver are secure communications events and to process the secure communication events with one of the secure applications, thereby preventing the secure communication event from being processed by the non-secure application;
   wherein one of the secure applications is a secure contacts application that lists one or more secure contacts that are attached to secure contact identification information;
   wherein the secure contacts application is part of a secure personal information manager that also includes a secure email application, a secure messaging application and a secure calendar application.

14. The computing device according to claim 13, further comprising a display that is configured to display the secure application or the non-secure application and the computing device is further configured to prevent certain data associated with a secure communication event from being displayed on the display in association with the operation of a non-secure application.

15. The computing device according to claim 13, wherein the computing device is further configured to compare contact identification associated with the communication events with the secure contact identification information attached to the secure contacts and this comparison serves as the basis for the determination of whether a communication event is a secure communication event.

16. The computing device according to claim 13, wherein a secure contact is also capable of being a personal contact on the computing device, and the personal contact is listed in a non-secure contacts application.

17. The computing device according to claim 14, wherein the computing device supports both a non-secure workspace and a secure workspace and the display is further configured to display muted notifications when a user is active on the non-secure workspace.

18. The computing device according to claim 13, wherein the communication events are telephone calls or messages.

* * * * *